United States Patent
Stein et al.

(10) Patent No.: US 9,725,120 B2
(45) Date of Patent: Aug. 8, 2017

(54) VEHICLE BODY WITH A REINFORCING COMPONENT OF THE NODES AND THE HINGE OF THE TAILGATE FRAME

(71) Applicant: Bayerische Motoren Werke Aktiengesellschaft, Munich, DE (US)

(72) Inventors: Michael Stein, Roehrmoos (DE); Sven Barsch, Germering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/974,568

(22) Filed: Dec. 18, 2015

(65) Prior Publication Data

US 2016/0107702 A1    Apr. 21, 2016

Related U.S. Application Data

(63) Continuation of application No. PCT/EP2014/062662, filed on Jun. 17, 2014.

(30) Foreign Application Priority Data

Jun. 19, 2013    (DE) .................... 10 2013 211 576

(51) Int. Cl.
*B60J 5/10*    (2006.01)
*B62D 25/08*    (2006.01)
(Continued)

(52) U.S. Cl.
CPC .............. *B62D 25/08* (2013.01); *B60J 5/101* (2013.01); *B62D 21/09* (2013.01); *B62D 25/04* (2013.01);
(Continued)

(58) Field of Classification Search
CPC .. B60J 5/10; B60J 5/101; B62D 25/04; B62D 25/06; B62D 25/08; B62D 27/023; E05Y 2800/682; E05Y 2900/546
(Continued)

(56) References Cited

U.S. PATENT DOCUMENTS 4,634,173 A    1/1987 Aonuma et al.
4,775,181 A *  10/1988 Shoda .................... B62D 25/06
                                                    296/202
(Continued)

FOREIGN PATENT DOCUMENTS

DE    10 2012 008 561 A1    10/2012
JP            9-2333 A        1/1997
(Continued)

OTHER PUBLICATIONS

International Search Report (PCT/ISA/210) issued in PCT Application No. PCT/EP2014/062662 dated Sep. 22, 2014, with English translation (four (4) pages).
German Search Report issued in counterpart German Application No. 10 2013 211 576.8, dated Mar. 17, 2014, with partial English translation (ten (10) pages).

*Primary Examiner* — Jason S Daniels
(74) *Attorney, Agent, or Firm* — Crowell & Moring LLP

(57) ABSTRACT

A vehicle body with a shell-type design includes at least one lateral frame, a tailgate frame which is connected to a node of the vehicle body by the lateral frame, and a reinforcing component which extends from the tailgate frame into the lateral frame. The tailgate frame and the lateral frame are each composed of an upper shell and a lower shell, and the reinforcing component is arranged between the upper and lower shells of the tailgate frame and the lateral frame. A hinge reinforcement for a hinge of a tailgate is formed in the reinforcing component in the region of the tailgate frame.

14 Claims, 4 Drawing Sheets

(51) Int. Cl.
*B62D 21/09* (2006.01)
*B62D 25/06* (2006.01)
*E05D 11/00* (2006.01)
*B62D 25/04* (2006.01)
*B62D 27/02* (2006.01)

(52) U.S. Cl.
CPC ........... B62D 25/06 (2013.01); B62D 27/023 (2013.01); B62D 27/026 (2013.01); E05D 11/00 (2013.01); *E05Y 2800/406* (2013.01); *E05Y 2800/682* (2013.01); *E05Y 2900/546* (2013.01)

(58) Field of Classification Search
USPC .................. 296/30, 193.08, 202, 203.04
See application file for complete search history.

(56) References Cited

U.S. PATENT DOCUMENTS

| | | | | |
|---|---|---|---|---|
| 6,126,232 A | * | 10/2000 | Nakano | B62D 25/06 296/202 |
| 6,254,174 B1 | * | 7/2001 | Wee | B62D 25/06 296/193.06 |
| 2004/0124671 A1 | | 7/2004 | Roehl | |
| 2012/0286542 A1 | * | 11/2012 | Kakiuchi | B62D 25/087 296/203.04 |

FOREIGN PATENT DOCUMENTS

| | | |
|---|---|---|
| JP | 2012-224109 A | 11/2012 |
| WO | WO 02/070326 A1 | 9/2002 |

* cited by examiner

VEHICLE BODY WITH A REINFORCING COMPONENT OF THE NODES AND THE HINGE OF THE TAILGATE FRAME

CROSS REFERENCE TO RELATED APPLICATIONS

This application is a continuation of PCT International Application No. PCT/EP2014/062662, filed Jun. 17, 2014, which claims priority under 35 U.S.C. §119 from German Patent Application No. 10 2013 211 576.8, filed Jun. 19, 2013, the entire disclosures of which are herein expressly incorporated by reference.

BACKGROUND AND SUMMARY OF THE INVENTION

The present invention relates to a vehicle body with a shell-type construction. In particular, the invention relates to a hinge reinforcement on the tailgate frame of the vehicle body.

Various self-supporting vehicle bodies of a shell-type construction (also: sheet-metal shell-type construction) are known from the prior art. A characteristic of the shell-type construction is that the various constituent parts of the body, such as, for example, the roof frame, the individual pillars or the sills, are in each case assembled from an upper shell and a lower shell. The assembled upper and lower shells form a closed profile with a cavity. The upper and lower shells are also referred to as outer and inner shells.

It is an object of the present invention to provide a vehicle body with a shell-type construction which, while being inexpensive to produce and assemble, is as operationally reliable as possible, durable and of lightweight construction.

This and other objects are achieved by a vehicle body with a shell-type construction. The vehicle body includes at least one lateral frame and at least one tailgate frame. The tailgate frame is connected at a node of the vehicle body to the lateral frame. The lateral frame includes, in particular, a roof frame and a rear pillar of the vehicle body. Depending on the refinement, the roof frame merges directly into the rear pillar, or the roof frame and the rear pillar are two individual constituent parts of the vehicle body that are connected to each other at the node. In the case of the vehicle body under consideration here, the tailgate frame does not directly receive the window. On the contrary, the tailgate is fastened to the tailgate frame.

The vehicle body according to the invention furthermore has at least one reinforcing component. The reinforcing component extends from the tailgate frame as far as into the lateral frame, i.e. in particular as far as into the roof frame and/or as far as into the rear pillar. The tailgate frame and the lateral frame each consist of upper shells and lower shells. The reinforcing component is arranged here between the upper and the lower shell of the tailgate frame and of the lateral frame. In the region of the tailgate frame, a hinge reinforcement is formed in the reinforcing component. The hinge reinforcement serves for the connection of a hinge of the tailgate. According to the invention, the reinforcing component extends from the hinge reinforcement as far as into the lateral frame. The reinforcing component is therefore used not only for reinforcement in the region of the hinge connection, but at the same time also constitutes a reinforcement in the region of the node and of the lateral frame. As a result, it is possible according to the invention with just one component, namely the reinforcing component, both to form the hinge reinforcement and also to provide expedient and local stiffening in the region of the lateral frame. As a result, this ensures a non-positive progression from the tailgate frame into the lateral frame and from the lateral frame into the tailgate frame. Local weaknesses in the rigidity in the region of the node are reinforced locally by the use according to the invention of the reinforcing component. Since only one component is used in order simultaneously to provide the hinge reinforcement and the local stiffening in the lateral frame, the assembly is simplified and the weight of the vehicle body is reduced.

It is preferably provided that the lateral frame includes a roof frame and a pillar. The pillar is, in particular, the rear pillar, for example the C pillar or the D pillar, of the vehicle body. Both the roof frame and the pillar are assembled from an upper shell and a lower shell. The roof frame, the rear pillar and the tailgate frame converge at the node. The reinforcing component extends from the tailgate frame as far as into the roof frame and/or as far as into the rear pillar. As a result, sufficient stiffening of the node region is possible.

The reinforcing component is preferably welded, riveted, adhesively bonded and/or brazed to the upper shell and/or to the lower shell of the tailgate frame. Furthermore, it is preferably provided that the reinforcing component is welded, riveted, adhesively bonded and/or brazed to the upper shell and/or to the lower shell of the lateral frame, i.e. in particular of the roof frame and/or of the rear pillar. As a result, a durable stiffening of the vehicle body by way of the reinforcing component is possible.

In the lateral frame, the reinforcing component is preferably designed as a partition. The partition is also referred to as partition plate. The partition extends transversely through the cavity formed by the upper and lower shell. The partition supports the upper shell in relation to the lower shell. The reinforcing component therefore preferably has two regions: the hinge reinforcement is formed in the first region of the reinforcing component. This region is located between upper and lower shell of the tailgate frame. In the second region, the reinforcing component is designed as at least one partition. This partition is located between upper and lower shell of the lateral frame and reinforces the lateral frame in this region.

Furthermore, it is preferably provided that the reinforcing component also has a region designed as a partition in the tailgate frame in order to stiffen the tailgate frame.

At the hinge reinforcement, the reinforcing component preferably bears flat against an inner side of the upper shell of the tailgate frame. This results in the formation of a relatively stiff region to which the hinge can be fastened.

The reinforcing component is preferably formed as a single piece. Alternatively thereto, it is possible to assemble the reinforcing component from a plurality of individual parts. The individual parts are connected fixedly and directly to one another here.

The upper and lower shells and the reinforcing component are preferably produced from deformed metal sheets.

The invention furthermore includes a motor vehicle, preferably having at least four wheels. The motor vehicle has one of the vehicle bodies just described and a tailgate. The tailgate is connected to the hinge reinforcement via at least one hinge.

The vehicle body or the motor vehicle preferably includes two reinforcing components for two hinges of the tailgate.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
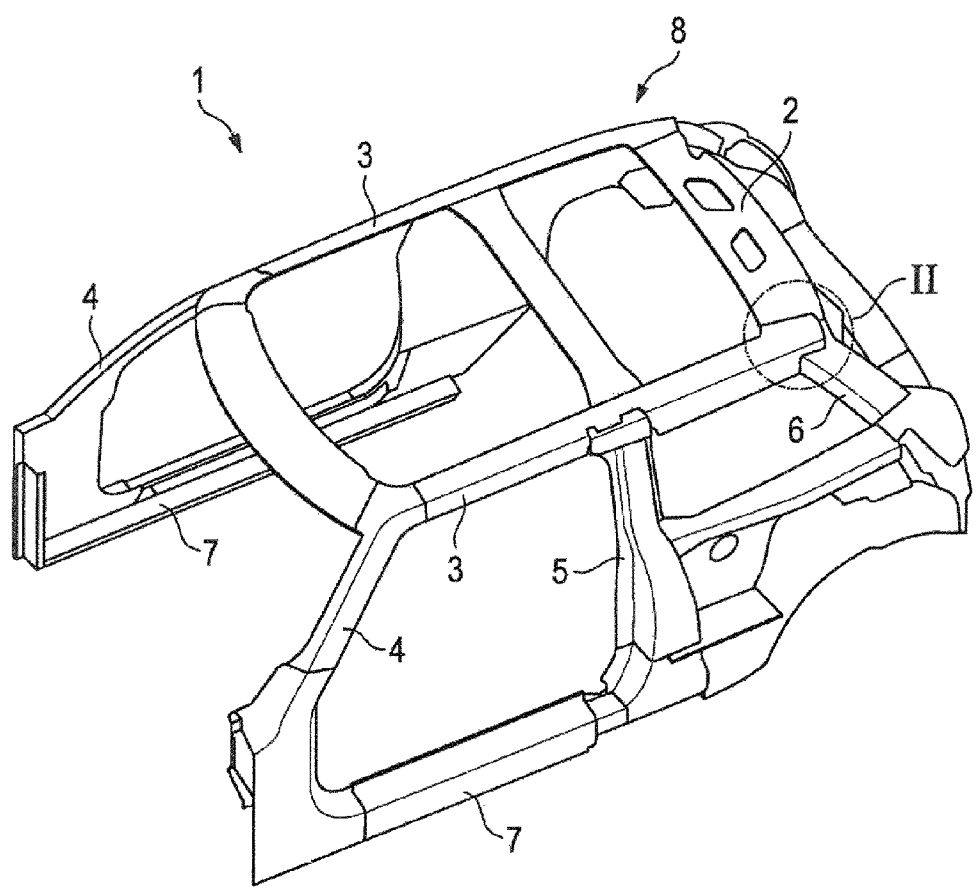
FIG. 1 is a perspective view illustrating a vehicle body according to the invention in accordance with a first exemplary embodiment.

Four exemplary embodiments of a vehicle body 1 will be described below. Identical or functionally identical components are provided with the same reference signs in all of the exemplary embodiments.

FIGS. 1 to 4 show the first exemplary embodiment of the vehicle body 1.

The vehicle body 1 includes a tailgate frame 2 which is connected at the ends thereof to a respective roof frame 3. Two parallel sills 7 extend in the lower region. The sills 7 are connected to the roof frames 3 via A pillars 4, B pillars 5 and C pillars 6. The respective roof frame 3 with the adjoining C pillar 6 is referred to as the lateral frame 8.

The vehicle body 1 is of sheet-metal shell-type construction. The individual constituent parts, in particular the tailgate frame 2, the roof frame 3, the A, B and C pillars 4, 5, 6 and the sills 7 are each assembled from an upper shell 11 and a lower shell 12 (see FIG. 4).

Figure 2:
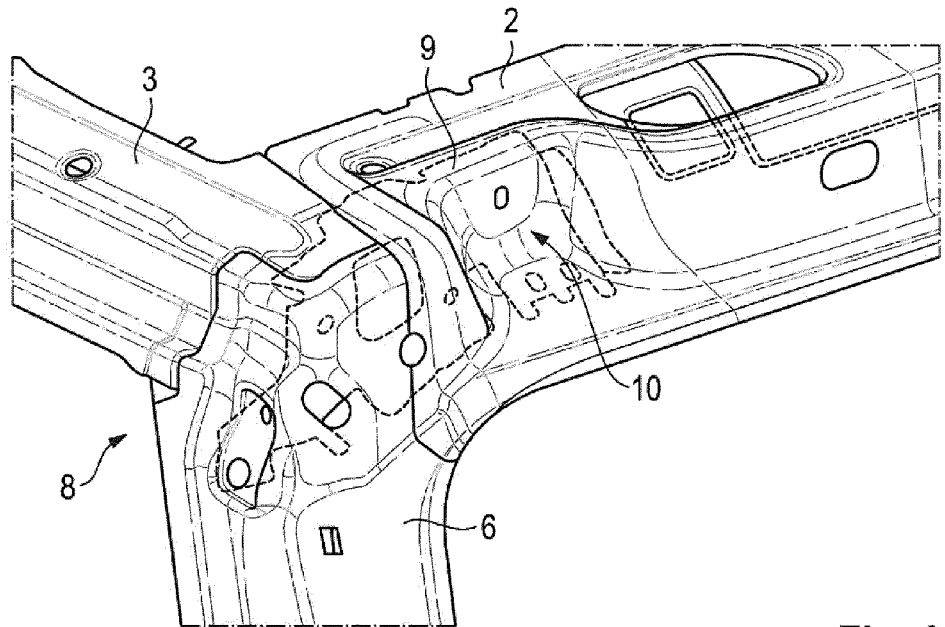
FIG. 2 is a detailed view of area II shown in FIG. 1.
Figure 3:
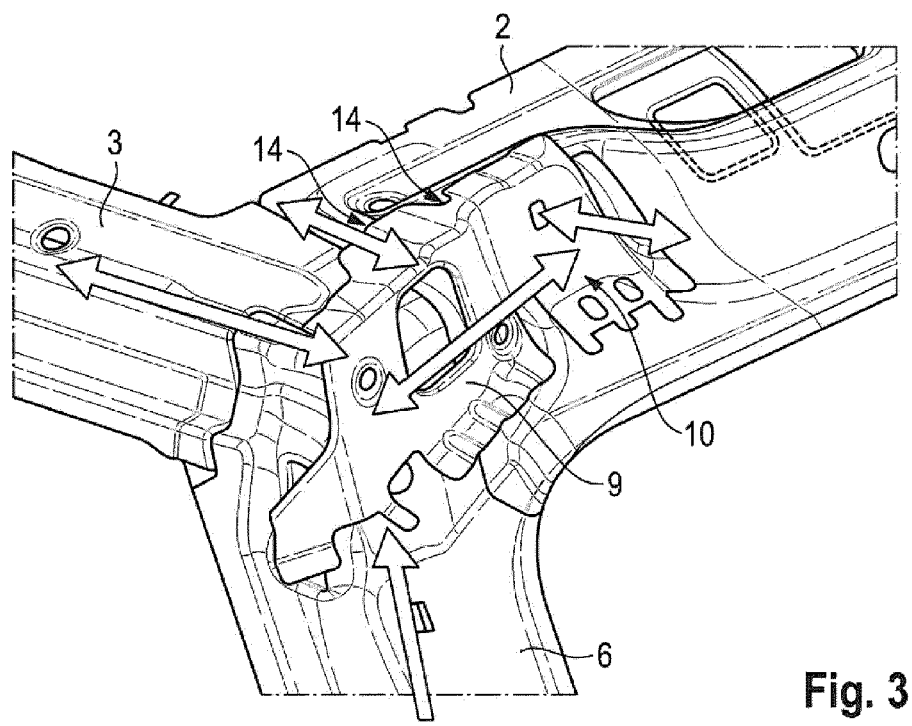
FIG. 3 is a schematic detailed view of area II shown in FIG. 1.
Figure 4:
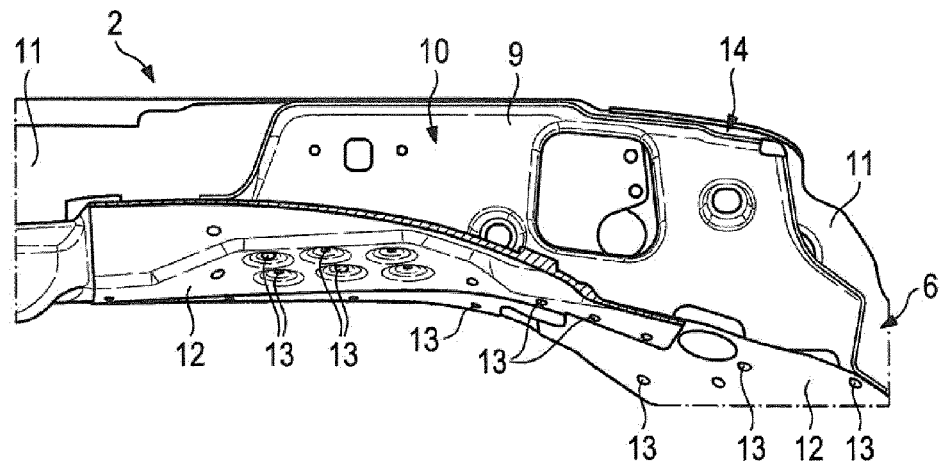
FIG. 4 illustrates a sectional view of FIG. 1.

A rear node of the vehicle body 1 is identified by area II in FIG. 1. FIGS. 2 to 4 show this detail area II.

FIG. 2 shows a reinforcing component 9 formed from a deformed metal sheet, which extends from the tailgate frame 2 as far as into the lateral frame 8. The reinforcing component 9 is located both in the tailgate frame 2 and in the lateral frame 8, in each case between upper and lower shell 11, 12. In the region of the tailgate frame 2, the reinforcing component 9 has a hinge reinforcement 10. A hinge for a tailgate can be connected to this hinge reinforcement 10. In the region of the lateral frame 8, the reinforcing component 9 serves as local stiffening.

FIG. 3 shows a schematic view in which the reinforcing component 9 is illustrated in emphasized form. As already described, the reinforcing component 9 is actually located between upper shells 11 and lower shells 12. On the right of the dashed line illustrated in FIG. 3, the reinforcing component 9 is designed as a hinge reinforcement 10. On the left of the dashed line, the reinforcing component 9 is designed as a partition 14. The reinforcing component 9 extends as the partition 14 between upper shell 11 and lower shell 12 in the region of the lateral frame 8. As a result, the reinforcing component 9 supports the upper shell 11 in relation to the lower shell 12.

FIG. 3 furthermore shows various load paths, illustrated by arrows. According to the invention, a continuous component, namely the reinforcing component 9, is used. The reinforcing component 9 extends from the tailgate frame 2 as far as into the lateral frame 8, i.e. as far as into the roof frame 3 and/or the C pillar 6. As a result, continuous load paths over the entire node region are possible. With only one reinforcing component 9, a plurality of functions are met: firstly, the hinge reinforcement 10 serves for the connection of the hinge of the tailgate. Secondly, the design of the reinforcing component 9 as the partition 14 ensures that the vehicle body 1 is stiffened in this region.

FIG. 4 shows a section through the detail area II. It can readily be seen here that the reinforcing component 9 is located in each case between upper shell 11 and lower shell 12. Furthermore, FIG. 4 shows the fixed connection of the reinforcing component 9 to the tailgate frame 2 and to the lateral frame 8 via weld points 13. In particular, in the region of the partition 14, the reinforcing component 9 does not bear flat against the upper shell 11 or lower shell 12, but rather extends transversely through the cavity, and therefore the upper shell 11 can be readily supported in relation to the lower shell 12.

Figure 5:
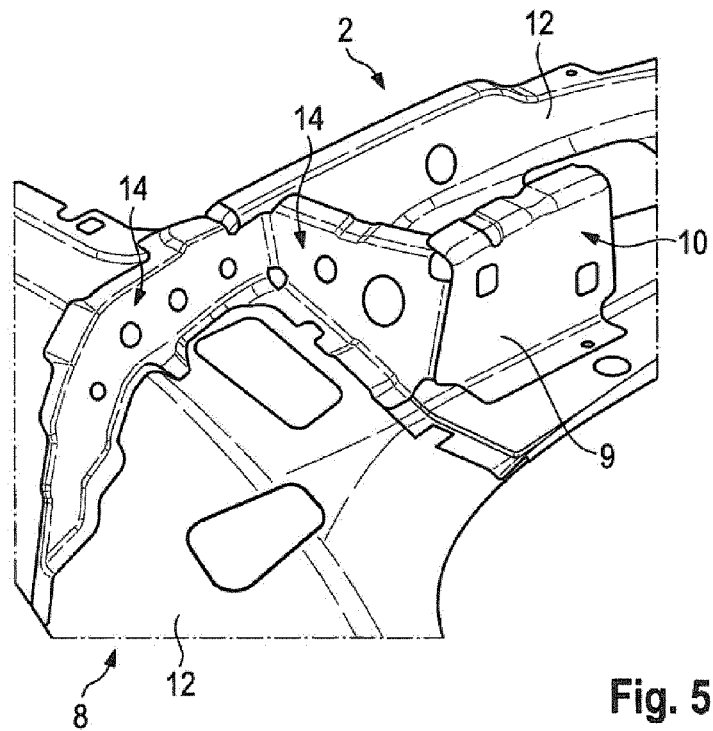
FIG. 5 illustrates a detail of a vehicle body according to the invention in accordance with a second exemplary embodiment.
Figure 6:
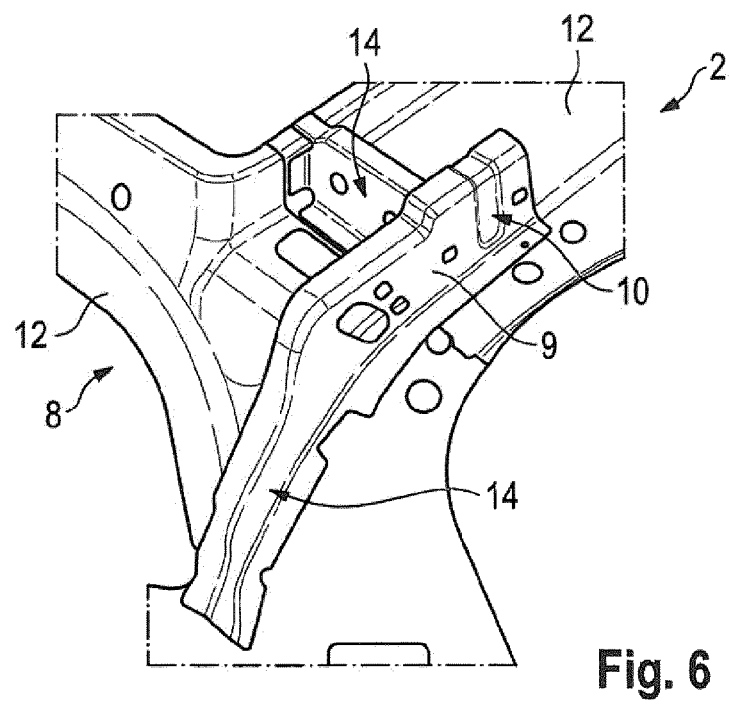
FIG. 6 illustrates a detail of a vehicle body according to the invention in accordance with a third exemplary embodiment.
Figure 7:
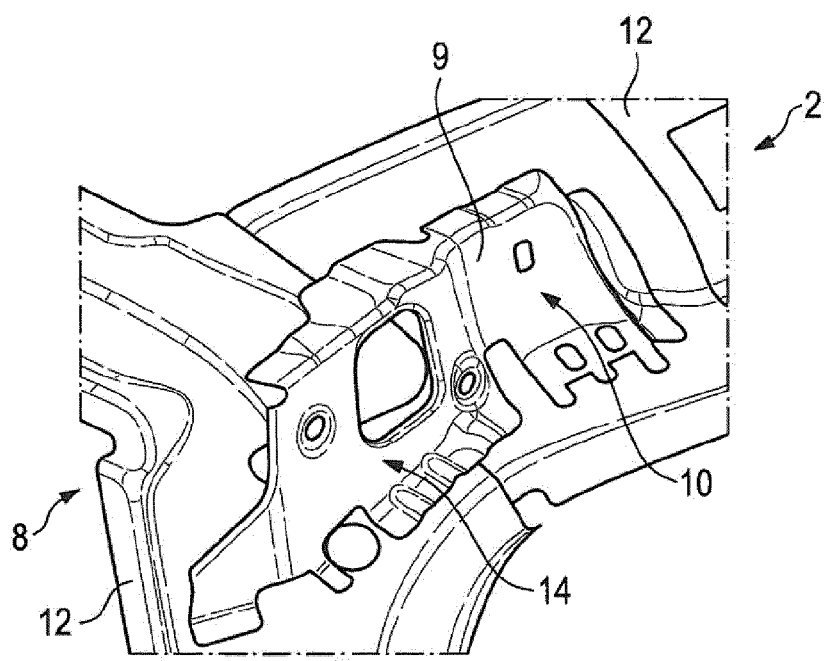
FIG. 7 illustrates a detail of a vehicle body according to the invention in accordance with a fourth exemplary embodiment.

FIGS. 5 to 7 show further exemplary embodiments of the vehicle body 1. A rear node at which the tailgate frame 2 is connected to the lateral frame 8 is shown in each case. In the exemplary embodiments according to FIGS. 5 to 7, the roof frame 3 merges directly into the rear pillar (C pillar 6). The upper shells 11 have been faded out in FIGS. 5 to 7 to provide a clear illustration.

The second exemplary embodiment according to FIG. 5 shows a design of the reinforcing component 9 with a hinge reinforcement 10 and two partitions 14. One of the partitions 14 is located in the tailgate frame 2. The second partition 14 stiffens the lateral frame 8. The two partitions 14 are designed as a single-piece, curved sheet-metal part. The hinge reinforcement 10 is welded to the adjacent partition 14.

In the third exemplary embodiment according to FIG. 6, a partition 14 is provided in the lateral frame 8 which merges directly into the hinge reinforcement 10. A further partition 14 which locally stiffens the tailgate frame 2 is welded onto the hinge reinforcement 10.

In the fourth exemplary embodiment according to FIG. 7, the reinforcing component 9 includes a hinge reinforcement 10 and a partition 14 in the lateral frame 8.

LIST OF REFERENCE SIGNS

1 Vehicle body
2 Tailgate frame
3 Roof frame
4 A pillar
5 B pillar
6 C pillar (rear pillar)
7 Sill
8 Lateral frame
9 Reinforcing component
10 Hinge reinforcement
11 Upper shell
12 Lower shell
13 Weld points
14 Partition The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle body of shell-type construction, comprising:
a lateral frame;
a tailgate frame which is connected at a node of the vehicle body to the lateral frame; and
one reinforcing component which extends from within the tailgate frame as far as into the lateral frame, wherein
the tailgate frame and the lateral frame are each assembled from an upper shell and a lower shell of the tailgate frame, and an upper shell and a lower shell of the lateral frame, respectively,
the reinforcing component is arranged between the upper and lower shells of the tailgate frame and of the lateral frame,
within the tailgate frame, a hinge reinforcement for a hinge of a tailgate is formed in the reinforcing component, and
the hinge reinforcement extends through a cavity formed between the upper and lower shells of the tailgate frame, and supports the upper shell of the tailgate frame against the lower shell of the tailgate frame.

2. The vehicle body according to claim 1, wherein the lateral frame comprises:
a roof frame, and
a pillar, wherein
the roof frame and the pillar are each assembled from the upper shell and the lower shell of the lateral frame, and wherein the reinforcing component extends as far as into the roof frame and/or as far as into the pillar.

3. The vehicle body according to claim 1, wherein the reinforcing component is welded, riveted, adhesively bonded and/or brazed to at least one of the upper shell or the lower shell of the tailgate frame.

4. The vehicle body according to claim 3, wherein the reinforcing component is welded, riveted, adhesively bonded and/or brazed to at least one of the upper shell or the lower shell of the lateral frame.

5. The vehicle body according to claim 4, wherein the reinforcing component is welded, riveted, adhesively bonded and/or brazed to at least one of an upper shell or a lower shell of a roof frame and/or a pillar forming the lateral frame.

6. The vehicle body according to claim 1, wherein the reinforcing component is welded, riveted, adhesively bonded and/or brazed to at least one of an upper shell or a lower shell of a roof frame and/or a pillar forming the lateral frame.

7. The vehicle body according to claim 1, wherein the reinforcing component is configured as a partition in the lateral frame, and wherein the partition extends through a cavity formed between the upper and lower shells of the lateral frame in order to support the upper shell of the lateral frame in relation to the lower shell of the lateral frame.

8. The vehicle body according to claim 1, wherein on the hinge reinforcement, the reinforcing component bears flat against an inner side of the upper shell of the tailgate frame.

9. The vehicle body according to claim 1, wherein the reinforcing component is a single piece.

10. The vehicle body according to claim 1, wherein the reinforcing component comprises a plurality of pieces that are fixedly and directly connected to one another.

11. The vehicle body according to claim 1, further comprising at least one hinge for a tailgate, wherein the hinge is attached to the hinge reinforcement.

12. The vehicle body according to claim 1, wherein the upper shells and the lower shells of the tailgate frame and the lateral frame, and the reinforcing component are formed of shaped metal sheets.

13. A motor vehicle, comprising:
a vehicle body with a shell-type construction;
a tailgate of the motor vehicle;
wherein the vehicle body comprises:
a lateral frame;
a tailgate frame which is connected at a node of the vehicle body to the lateral frame; and
one reinforcing component which extends from within the tailgate frame as far as into the lateral frame, wherein
the tailgate frame and the lateral frame are each assembled from an upper shell and a lower shell of the tailgate frame, and an upper shell and a lower shell of the lateral frame, respectively,
the reinforcing component is arranged between the upper and lower shells of the tailgate frame and of the lateral frame,
within the tailgate frame, a hinge reinforcement for a hinge of the tailgate is formed in the reinforcing component,
the hinge reinforcement extends through a cavity formed between the upper and lower shells of the tailgate frame, and supports the upper shell of the tailgate frame against the lower shell of the tailgate frame, and
the tailgate is connected to the hinge reinforcement via at least one hinge.

14. The motor vehicle according to claim 13, wherein the motor vehicle is a four wheel motor vehicle.

* * * * *